(12) United States Patent
Huang

(10) Patent No.: US 12,067,704 B2
(45) Date of Patent: Aug. 20, 2024

(54) DEFECT CHARACTERIZATION METHOD AND APPARATUS

(71) Applicant: CHANGXIN MEMORY TECHNOLOGIES, INC., Hefei (CN)

(72) Inventor: Ning Huang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 482 days.

(21) Appl. No.: 17/451,819

(22) Filed: Oct. 21, 2021

(65) Prior Publication Data

US 2022/0301147 A1 Sep. 22, 2022

Related U.S. Application Data

(63) Continuation of application No. PCT/CN2021/108276, filed on Jul. 23, 2021.

(30) Foreign Application Priority Data

Mar. 18, 2021 (CN) .......................... 202110290131.8

(51) Int. Cl.
*G06T 7/00* (2017.01)
*G01N 21/95* (2006.01)
*G01N 23/2251* (2018.01)

(52) U.S. Cl.
CPC ....... *G06T 7/0004* (2013.01); *G01N 21/9501* (2013.01); *G01N 23/2251* (2013.01); *G01N 2201/06113* (2013.01); *G01N 2223/07* (2013.01); *G01N 2223/418* (2013.01); *G01N 2223/507* (2013.01);

(Continued)

(58) Field of Classification Search
CPC ......... G06T 7/0004; G06T 2207/10061; G06T 2207/30148; G01N 21/9501; G01N 23/2251; G01N 2201/06113; G01N 2223/07; G01N 2223/418;

(Continued)

(56) References Cited

U.S. PATENT DOCUMENTS 8,121,397 B2 2/2012 Harada
9,401,015 B2 * 7/2016 Minekawa .............. G06F 18/24

(Continued)

FOREIGN PATENT DOCUMENTS

CN 103502801 A 1/2014
CN 104870985 A 8/2015

(Continued)

*Primary Examiner* — Roy M Punnoose
(74) *Attorney, Agent, or Firm* — Syncoda LLC; Feng Ma

(57) ABSTRACT

A defect characterization method includes: a first scanning image and target defect coordinates in the first scanning image are obtained; a first defect image is obtained according to the target defect coordinates in the first scanning image, the first defect image containing a defect area where a target defect is located and a noise area not containing the target defect; the noise area is marked, Automatic Defect Review (ADR) calculation is performed on the defect area, and a pixel level value of a defect in the defect area is obtained; coordinates of the defect with a maximum pixel level value are obtained, and a second defect image is obtained according to the coordinates of the defect with the maximum pixel level value; and the defect with the maximum pixel level value is classified according to the second defect image.

18 Claims, 4 Drawing Sheets

(52) U.S. Cl.
CPC .............. *G01N 2223/6116* (2013.01); *G06T 2207/10061* (2013.01); *G06T 2207/30148* (2013.01)

(58) Field of Classification Search
CPC ..... G01N 2223/507; G01N 2223/6116; G01N 2021/8861; G01N 2021/8887; G01N 21/95684
USPC ........................................................ 382/148
See application file for complete search history.

(56) References Cited

U.S. PATENT DOCUMENTS

| | | | |
|---|---|---|---|
| 9,569,836 B2* | 2/2017 | Hirai | G06F 18/00 |
| 9,811,897 B2* | 11/2017 | Harada | G06T 7/001 |
| 2009/0252403 A1 | 10/2009 | Harada | |
| 2014/0072204 A1* | 3/2014 | Minekawa | G06F 18/24 |
| | | | 382/149 |
| 2015/0302568 A1* | 10/2015 | Hirai | G06F 18/00 |
| | | | 382/149 |
| 2015/0332445 A1* | 11/2015 | Harada | G06T 7/001 |
| | | | 382/149 |

FOREIGN PATENT DOCUMENTS

| | | |
|---|---|---|
| CN | 104903712 A | 9/2015 |
| CN | 106097361 A | 11/2016 |
| CN | 108230321 A | 6/2018 |
| CN | 104737280 B | 8/2018 |
| CN | 110969598 A | 4/2020 |
| CN | 113012128 A | 6/2021 |

\* cited by examiner

DEFECT CHARACTERIZATION METHOD AND APPARATUS

CROSS-REFERENCE TO RELATED APPLICATIONS

The application is continuation of International Application No. PCT/CN2021/108276 filed on Jul. 23, 2021, which claims priority to Chinese Patent Application No. 202110290131.8 filed on Mar. 18, 2021. The disclosures of the above-referenced applications are hereby incorporated by reference in their entirety.

BACKGROUND

In order to ensure high yield in semiconductor manufacturing, it is important to find early defects in a manufacturing process and implement countermeasures. In recent years, with the miniaturization of semiconductor, more and more defects, which are increasingly tiny, are generated in the manufacturing process, and therefore, Scanning Electric Microscope (SEM) is introduced to detect the defects and present detected defect images to workers.

SUMMARY

The application relates, but is not limited, to the technical field of semiconductors.

According to some embodiments, a first aspect of the application provides a defect characterization method, which may include the following operations. A first scanning image and target defect coordinates in the first scanning image are obtained. A first defect image is obtained according to the target defect coordinates in the first scanning image, the first defect image containing a defect area where a target defect is located and a noise area not containing the target defect. The noise area is marked, ADR calculation is performed on the defect area, and a pixel level value of a defect in the defect area is obtained. Coordinates of the defect with the maximum pixel level value are obtained, and a second defect image is obtained according to the coordinates of the defect with the maximum pixel level value. The defect with the maximum pixel level value is classified according to the second defect image.

According to some embodiments, a second aspect of the application provides a terminal device, which may include a memory, a processor and a transceiver. The memory is configured to storage an instruction. The transceiver is configured to communicate with other devices. When executing the instruction stored in the memory, the processor is configured to: obtain a first scanning image and target defect coordinates in the first scanning image; obtain a first defect image according to the target defect coordinates in the first scanning image, the first defect image containing a defect area where a target defect is located and a noise area not containing the target defect; mark the noise area, performing ADR calculation on the defect area, and obtain a pixel level value of a defect in the defect area; obtain coordinates of the defect with a maximum pixel level value, and obtain a second defect image according to the coordinates of the defect with the maximum pixel level value; and classify the defect with the maximum pixel level value according to the second defect image.

According to some embodiments, a third aspect of the application provides a nonvolatile computer readable storage medium. A computer execution instruction is stored in the computer readable storage medium. When the instruction is executed, a computer is enabled to: obtain a first scanning image and target defect coordinates in the first scanning image; obtain a first defect image according to the target defect coordinates in the first scanning image, the first defect image containing a defect area where a target defect is located and a noise area not containing the target defect; mark the noise area, performing ADR calculation on the defect area, and obtain a pixel level value of a defect in the defect area; obtain coordinates of the defect with a maximum pixel level value, and obtain a second defect image according to the coordinates of the defect with the maximum pixel level value; and classify the defect with the maximum pixel level value according to the second defect image.

BRIEF DESCRIPTION OF THE DRAWINGS

The drawings required to be used in descriptions about the embodiments will be simply introduced below. It is apparent that the drawings described below are only some embodiments of the application. Other drawings may further be obtained by those of ordinary skilled in the art according to these drawings without creative work.

DETAILED DESCRIPTION

Figure 1:
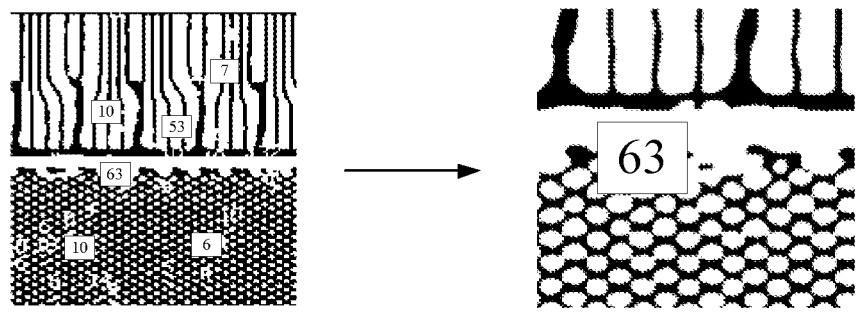
FIG. 1 is a schematic diagram of defect characterization in an implementation.

Exemplary embodiments will be described in detail here, and examples thereof are shown in the drawings. When the following description relates to the drawings, unless otherwise indicated, the same numbers in different drawings represent the same or similar elements. The implementation modes described in the following exemplary embodiments do not represent all implementation modes consistent with the disclosure. Instead, they are only examples of apparatuses and methods consistent with some aspects of the disclosure as detailed in the appended claims.

Defects of the semiconductor are generally detected by Automatic Defect Review (ADR), and the detected defects are classified. Specifically, the SEM scans a surface of the semiconductor to obtain a scanning image, a scanning machine determines the coordinates of a defect according to the scanning image, and then sends the coordinates of the defect to an analysis machine, and the analysis machine processes the scanning image based on the coordinates of the defect and an ADR algorithm to obtain a defect image. The defect image is determined from the calculation of a pixel level value of the scanning image through the ADR algorithm and determination of an image area corresponding to the maximum pixel level value as the defect image.

However, in the semiconductor manufacturing process, some manufacturing processes will cause some specific defects on the semiconductor. Researchers need to improve the manufacturing process according to these specific defects, so as to improve the yield of the semiconductor. However, the pixel level value corresponding to these specific defects is not necessarily the maximum pixel level value, so the defect image corresponding to these specific defects cannot be found according to a method in the prior art. In addition, the researchers sometimes need to obtain some specific defect images for further research and analysis to improve the semiconductor manufacturing process. Therefore, there is an urgent need for a defect image of a specific defect of the semiconductor to improve the yield of the semiconductor in semiconductor manufacturing.

With the miniaturization of a semiconductor, more and more defects, which are increasingly tiny, are generated in the semiconductor manufacturing process, and the defects are detected generally through an SEM. As shown in FIG. 1, a maximum pixel level value of the defect in a scanning image is determined through ADR, and then an image area corresponding to the defect with the maximum pixel level value is determined as a defect image. However, some specific defects will be generated in some manufacturing processes of the semiconductor. The determination of these specific defects is more conducive to improving the yield of the semiconductor.

The specific defects of the semiconductor cannot be determined in existing technologies. Therefore, a defect characterization method and apparatus are provided in the embodiments of the application. In the defect characterization method, a first defect image is obtained according to target defect coordinates in an obtained scanning image, a noise area in the first defect image is marked to distinguish the noise area and a defect area in the first defect image, then ADR calculation is performed on the defect area, and finally, a defect image corresponding to the defect with the maximum pixel level value in the defect area is obtained. The noise area may also be understood as an interference area. The maximum pixel level value of the defect in the noise area may be greater than the maximum pixel level value of the defect in the defect area. After the noise area is marked, the interference that would affect the determination process of the defect with the maximum pixel level value in the defect area can be removed. Thus, a researcher may mark the noise area to shield the area where they do not want to detect the defect, only detect the defect area, and then obtain the defect image corresponding to the specific defect. After the defect image corresponding to the specific defect is analyzed, the defect type to be analyzed may be obtained. Therefore, the defect characterization method provided by the application can obtain the defect image of a specific defect of the semiconductor, so as to improve the yield of the semiconductor.

Figure 2:
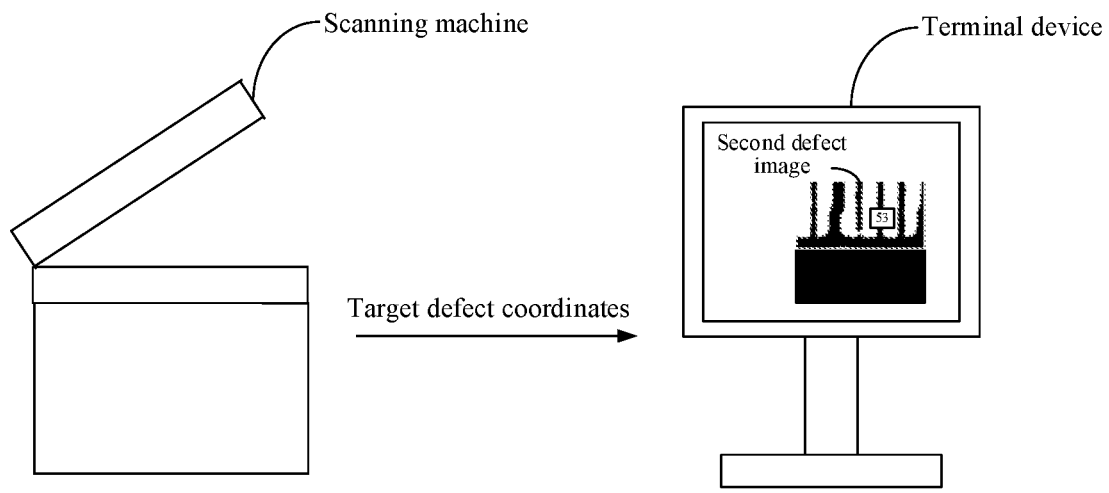
FIG. 2 is a schematic diagram of an application scene of a defect characterization method provided in some embodiments of the application.
Figure 3:
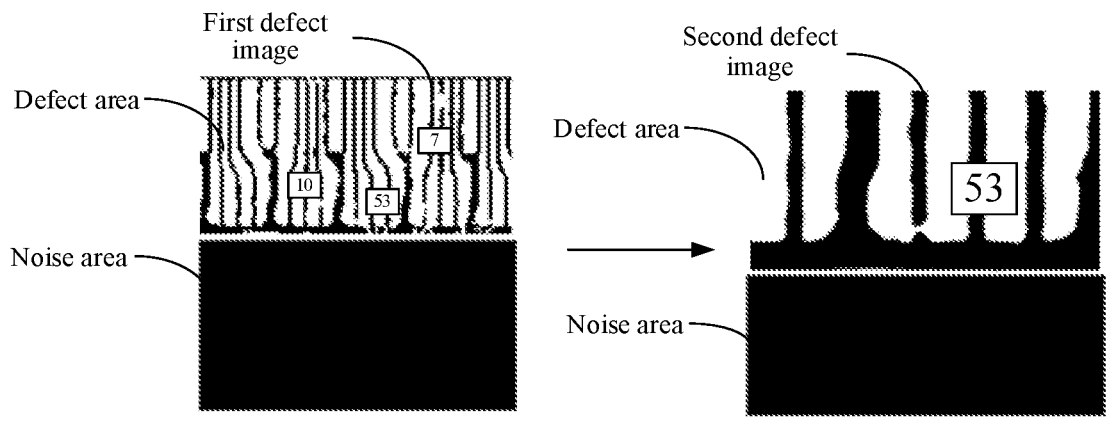
FIG. 3 is a schematic diagram of the application of a defect characterization method provided in an embodiment of the application.

The embodiments of the application provide a defect characterization method, which is applied to a terminal device, such as a server or machine dedicated to defect analysis in a laboratory, or a computer device not dedicated to the laboratory. In some embodiments, the terminal device may include a review SEM. FIG. 2 is a schematic diagram of an application scene of the defect characterization method provided by the application. In the figure, the terminal device receives target defect coordinates in a first scanning image sent by a scanning machine (the machine dedicated to obtaining the first scanning image and the target defect coordinates in the first scanning image), and obtains the first defect image from the first scanning image according to the target defect coordinates. After ADR calculation is performed on the first defect image, a second defect image containing the defect with the maximum pixel level value in the first defect image (the maximum pixel level value as shown in FIG. 3 is 53) is obtained, and then, defect classification is performed on the second defect image, so that a defect classification result is obtained.

Figure 4:
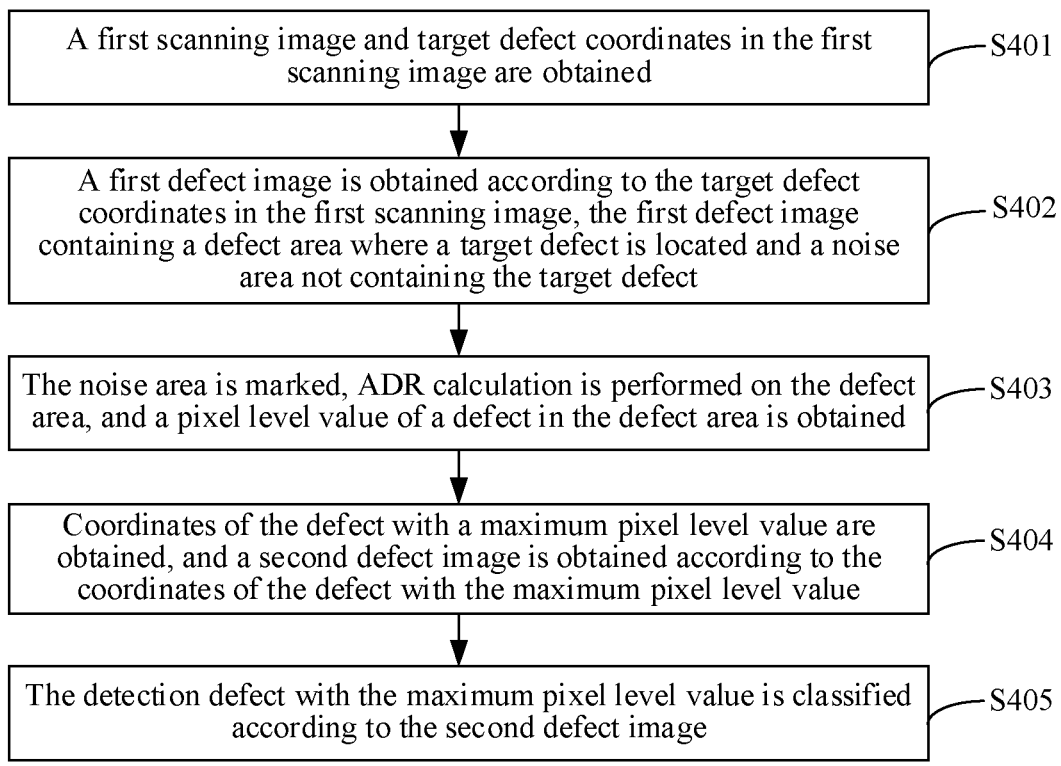
FIG. 4 is a schematic flowchart of a defect characterization method provided in a first embodiment of the application.

Please referring to FIG. 4, the first embodiment of the application provides a defect characterization method, which may include the following operations.

At S401, a first scanning image and target defect coordinates in the first scanning image are obtained.

In some embodiments, the first scanning image may be obtained through a check system on the terminal device, and the check system may at least include a laser scanning patterned defect check system.

The first scanning image is an image obtained by the laser scanning patterned defect check system which scans a detected surface of semiconductor. The laser scanning patterned defect check system may be set on the terminal device, and the first scanning image may be directly obtained by the terminal device. In an embodiment, the first scanning image may be input to the terminal device from outside or may be stored in the terminal device in advance.

The target defect coordinates in the first scanning image are sent to the terminal device by the scanning machine. In some embodiments, the target defect coordinates are obtained by the scanning machine, and can not be directly obtained by the terminal device. In an embodiment, a device for obtaining the target defect coordinates in the first scanning image may also be added to the terminal device.

At S402, a first defect image is obtained according to the target defect coordinates in the first scanning image, the first defect image containing a defect area where a target defect is located and a noise area not containing the target defect.

The noise area refers to an area that will interfere with the determination of the target defect. The defect images as shown in FIG. 1 and FIG. 3 are images marked with the pixel level value of the defects through ADR calculation. In the defect image of FIG. 1, the maximum pixel level value of the defects is 63, However, if the defect corresponding to the maximum pixel level value of 63 is not the defect that a researcher wants to analyze, and the defect that the researcher wants to analyze is the defect corresponding to the pixel level value of 53 as shown in FIG. 3, the area where the defect with the maximum pixel level value of 63 in FIG. 1 is determined as the noise area, and the area where the defect with the pixel level value of 53 is determined as the defect area (the marked first defect image is shown in FIG. 3).

In some embodiments, the terminal device takes the target defect coordinates as the center point coordinates to obtain the first defect image containing the target defect, that is, the geometric center point of the first defect image is the position point where the target defect coordinates is located. In one or more embodiments, the first defect image may be a rectangular image obtained with the target defect coordinates as the center point coordinates, or may be a circular image, an elliptical image, etc.

In one or more embodiments, the first defect image is an image for scanning imaging of the target defect with the target defect coordinates as the center point. The resolution of the first defect image is greater than the resolution of the first scanning image.

At S403, the noise area is marked, ADR calculation is performed on the defect area, and a pixel level value of a defect in the defect area is obtained.

The marking of the noise area may be performed autonomously by the terminal device, or may be performed in response to an instruction input by a researcher on the terminal device. The marking of the noise area, such as weakening the image resolution of the noise area, cutting off the noise area from the first defect image, or other methods for marking, only needs to enable the terminal device to identify the noise area and the defect area. After the terminal device identifies the noise area and the defect area, the terminal device performs ADR calculation on the defect area, and the pixel level value of the defect in the defect area may be determined through the ADR calculation (the pixel level value of the defect in the defect area as shown in FIG. 3 is 53, 10, 7, etc.).

It is to be noted that, before ADR calculation is performed, it is necessary to judge the resolution of the first defect image. When the resolution of the first defect image meets the requirements of ADR calculation, ADR calculation is performed for the defect area. Before ADR calculation is performed, the parameters of ADR calculation may also be set to improve the accuracy of ADR calculation.

At S404, coordinates of the defect with the maximum pixel level value are obtained, and a second defect image is obtained according to the coordinates of the defect with the maximum pixel level value.

As shown in FIG. 3, the maximum pixel level value of the defect in the defect area is 53. After determining the maximum pixel level value, the terminal device obtains the second defect image according to the coordinates of the defect with the maximum pixel level value. At this time, the second defect image is an image that enlarges the area image where the coordinates of the defect with the maximum pixel level value are located, that is, an image that locally enlarges the first defect image. That is, the terminal device locally enlarges the first defect image with the coordinates of the defect with the maximum pixel value as the center point coordinates to obtain the second defect image.

In some embodiments, the first defect image and the second defect image may be obtained through the check system on the terminal device, and the check system may include a review SEM.

At S405, the defect with the maximum pixel level value is classified according to the second defect image.

The second defect image is a defect image obtained by enlarging the first defect image based on the coordinates of the defect with the maximum pixel level value in the defect area. It can be understood that, the resolution of the first scanning image obtained by scanning through the laser scanning patterned defect check system is relatively low. It may only determine whether there are defects in the image and determine the defect coordinates through the first scanning image, but the resolution of the first scanning image is not enough to support defect classification and further analysis of defects. Therefore, in the embodiment, the first scanning image and the target defect coordinates in the first scanning image are obtained through the laser scanning patterned defect check system, the defect image with relatively high resolution is obtained through the review SEM according to the target defect coordinates, and the area for defect analysis in the defect image is accurately enlarged, so as to ensure that the defect type to be analyzed may be analyzed according to the enlarged defect image.

The embodiment provides a defect characterization method. According to obtained target defect coordinates, a detect image is obtained from an obtained first scanning image so as to obtain a first defect image, then, a noise area of the first defect image is marked so as to ensure that only a defect area to be analyzed is analyzed, which avoids unnecessary ADR calculation, and improves the efficiency and speed of defect analysis. The finally obtained second defect image is an enlarged image of an analyzed defect area in the first scanning image. At this time, the defects to be analyzed in the first scanning image may be analyzed based on the second defect image. Therefore, the defect characterization method provided by the embodiment may ensure that the defect image to be analyzed in the first scanning image may be obtained, improve the efficiency of defect analysis, meet personalized defect analysis requirements, and improve the yield of the semiconductor.

Figure 5:
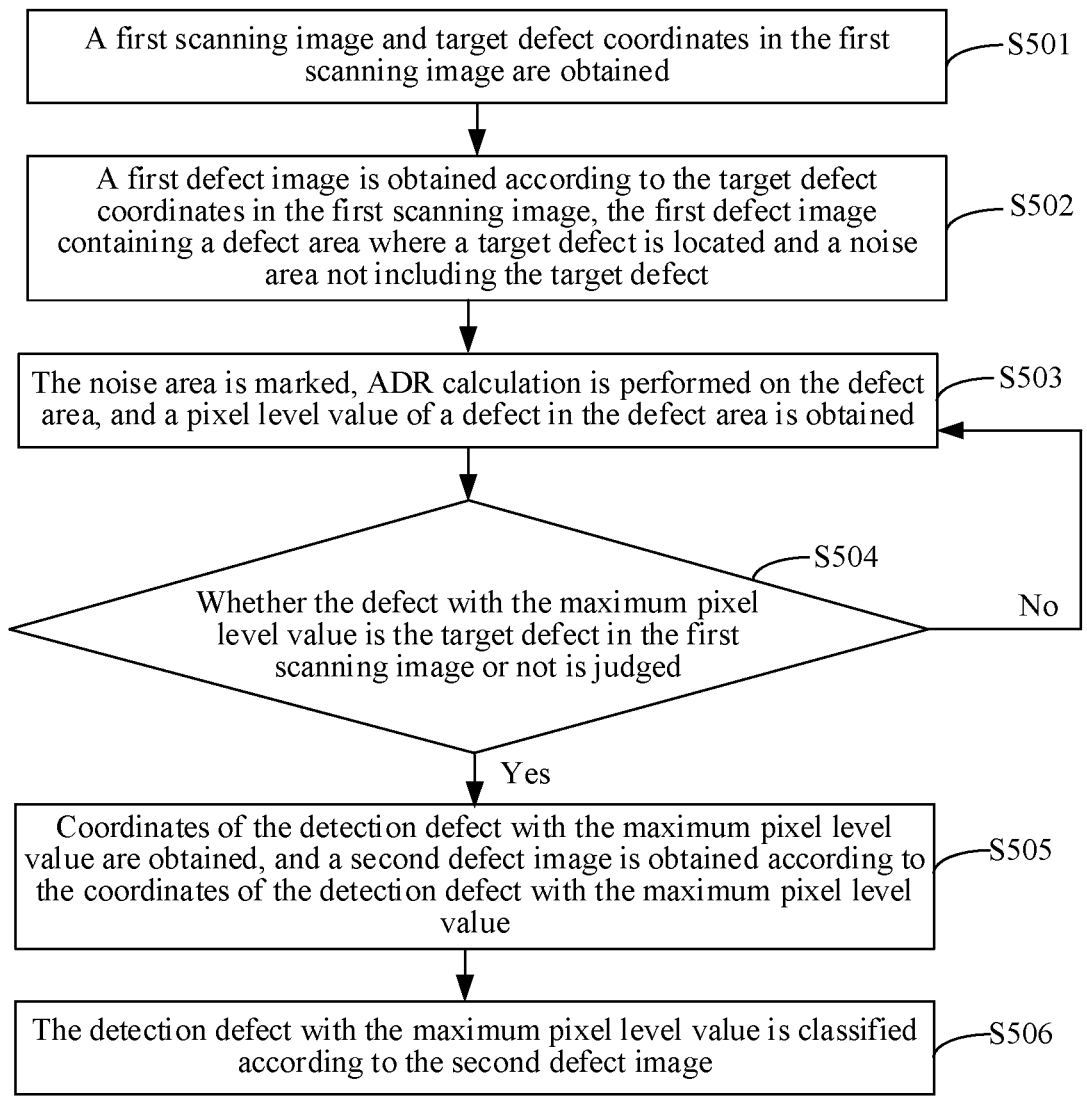
FIG. 5 is a schematic flowchart of a defect characterization method provided in a second embodiment of the application.

Please referring to FIG. 5, the second embodiment of the application provides a defect characterization method, which may include the following operations.

At S501, a first scanning image and target defect coordinates in the first scanning image are obtained.

At S502, a first defect image is obtained according to the target defect coordinates in the first scanning image, the first defect image containing a defect area where a target defect is located and a noise area not containing the target defect.

At S503, the noise area is marked, ADR calculation is performed on the defect area, and a pixel level value of a defect in the defect area is obtained.

The relevant description of S501-S503 may refer to the relevant description of S401-S403 in the first embodiment, which will not be elaborated here.

At S504, whether the defect with the maximum pixel level value is the target defect in the first scanning image or not is judged.

Although the resolution of the first scanning image is not enough to analyze and classify defects, the terminal device may determine the image feature of the target defect from the first scanning image, and the terminal device may also obtain the target defect coordinates of the target defect. After the defect with the maximum pixel level value is obtained, the terminal device may compare the target defect with the defect with the maximum pixel value. For example, the terminal device obtains the image feature of the defect with the maximum pixel value, and then compares and analyzes it with the image feature of the target defect. A specific method for the terminal device to compare and analyze the defect with the maximum pixel level value and the target defect in the first scanning image may be selected according to actual needs, and the application is not limited.

If so, following S505 to S506 are performed.

As in S504, the terminal device analyzes and compares the image feature of the target defect with the image feature of the defect with the maximum pixel level value. If the similarity between the image feature of the target defect and the image feature of the defect with the maximum pixel level value is equal to or larger than a preset similarity, it is determined that the defect with the maximum pixel level value is the target defect in the first scanning image. The preset similarity may be set according to actual needs. For example, the preset similarity is 98% or 99%.

If not, it returns to execute S503 to S504, that is, the defect area containing the defect with the maximum pixel level value in the first defect image is marked, ADR calculation is performed on unmarked area in the defect area, a defect with the maximum pixel level value is obtained again, and whether the defect with the maximum pixel level value is the target defect in the first scanning image or not is judged. The above steps are repeated until the defect with the maximum pixel level value is the target defect in the first scanning image.

That is, if the defect with the maximum pixel level value is not a target defect in the first scanning image, for example, the similarity between the image feature of the target defect described in S504 and the image feature of the defect with the maximum pixel level value is less than the preset similarity, at this time, it is necessary to further mark the defect area in the first defect image, and the defect area in the first defect image is re-divided into a noise area and a defect area to obtain a defect area with a smaller range. At this time, the terminal device performs ADR calculation on the defect area with the smaller range obtained after the re-division, and obtains the defect with the maximum pixel level value in the defect area in the smaller range again. If the defect with the maximum pixel level value is the target defect in the first scanning image, the defect with the maximum pixel level value is classified, and an engineer analyzes according to the type of the target defect to determine the cause of the defect, so as to make corresponding execution steps to eliminate the generation of the target defect in the subsequent batch of semiconductor.

At S505, coordinates of the defect with the maximum pixel level value are obtained, and a second defect image is obtained according to the coordinates of the defect with the maximum pixel level value.

The defect with the maximum pixel level value is judged in S504, and S505 is executed only when the defect with the maximum pixel level value is the target defect in the first scanning image. Therefore, at this time, the coordinates of the defect with the maximum pixel level value obtained in S505 are the coordinates of the target defect in the first scanning image, and the second defect image is an image that accurately scans and images the area where the target defect is located in the first scanning image.

At S506, the defect with the maximum pixel level value is classified according to the second defect image.

The relevant description of S506 may refer to the relevant description of S405 in the first embodiment, which will not be elaborated here.

The defect characterization method provided in the embodiment may repeatedly judge and screen the obtained defect with the maximum pixel level value until the defect with the maximum pixel level value is the target defect in the first scanning image. At this time, low accuracy of defect analysis results and high analysis cost and the like caused by defect acquisition errors can be avoided, so as to improve the yield of the semiconductor.

Figure 6:
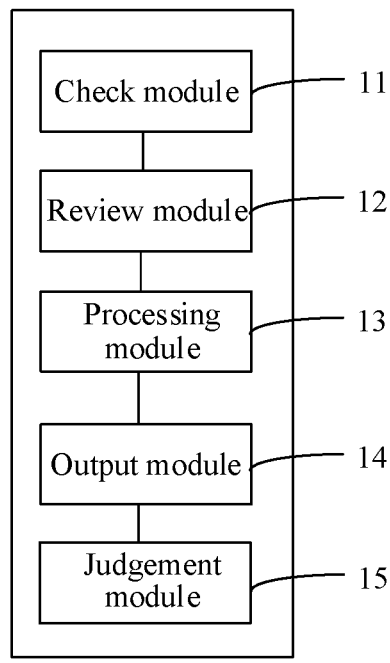
FIG. 6 is a schematic diagram of a defect characterization device provided in a third embodiment of the application.

Please referring to FIG. 6, the third embodiment of the application provides a defect characterization apparatus 10, which may include a check module 11, a review module 12, a processing module 13 and an output module 14.

The check module 11 is configured to obtain a first scanning image and target defect coordinates in the first scanning image. The check module 11 is further configured to obtain a first scanning image through a check system, the check system including a laser scanning patterned defect check system. The resolution of the first defect image is greater than the resolution of the first scanning image.

The review module 12 is configured to obtain a first defect image according to the target defect coordinates in the first scanning image, the first defect image containing a defect area where a target defect is located and a noise area not containing the target defect. The review module may include a review SEM. The review module 12 is further configured to obtain the first defect image containing the target defect with the target defect coordinates as the center point coordinates. The review module 12 is further configured to locally enlarge the first defect image with the coordinates of the defect with the maximum pixel level value as the center point coordinates to obtain the second defect image.

The processing module 13 is configured to mark the noise area, perform ADR calculation on the defect area, and obtain a pixel level value of a defect in the defect area.

The review module 12 is further configured to obtain coordinates of the defect with the maximum pixel level value and obtain a second defect image according to the coordinates of the defect with the maximum pixel level value.

The output module 14 is configured to classify the defect with the maximum pixel level value according to the second defect image.

The defect characterization apparatus 10 may further include a judgement module 15.

The judgement module 15 is configured to judge whether the defect with the maximum pixel level value is the target defect in the first scanning image or not.

If so, the defect with the maximum pixel level value is classified.

If not, it returns to mark the defect area containing the defect with the maximum pixel level value in the first defect image, ADR calculation is performed on the unmarked area in the defect area, the defect with the maximum pixel level value is obtained again, whether the defect with the maximum pixel level value is the target defect in the first scanning image or not is judged, and the above steps are repeated till the defect with the maximum pixel level value is the target defect in the first scanning image.

The defect characterization apparatus provided by the embodiment may be configured to execute the defect characterization method provided by the first embodiment to the second embodiment above, and the specific implementation mode and the technical effect are similar, which will not be elaborated here.

Figure 7:
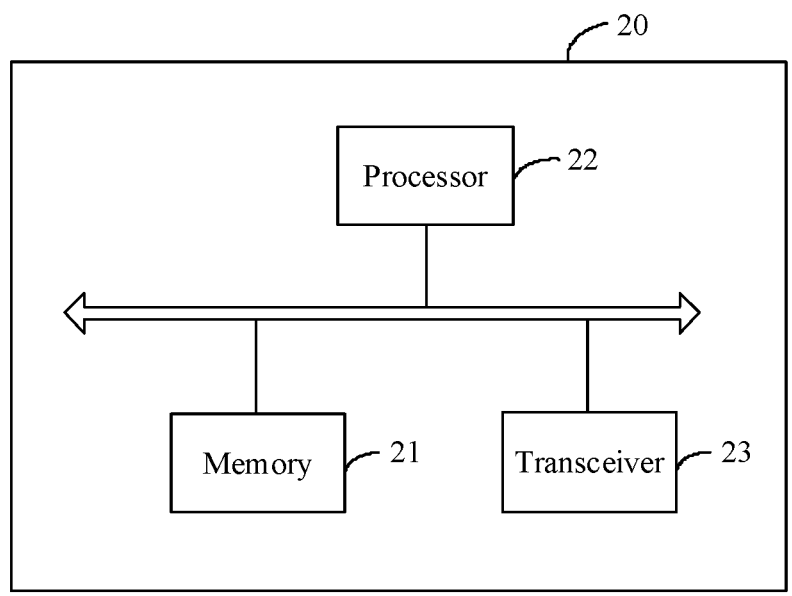
FIG. 7 is a schematic diagram of a terminal device provided in a fourth embodiment of the application.

Referring to FIG. 7, the fourth embodiment of the application further provides a terminal device 20, which may include a memory 21, a processor 22 and a transceiver 23. The memory 21 is configured to store an instruction. The transceiver 23 is configured to communicate with other devices. The processor 22 is configured to execute the instruction stored in the memory 21 to enable the terminal device to execute the defect characterization method provided by the first embodiment to the second embodiment described above, and the specific implementation mode and the technical effect are similar, which will not be elaborated here.

The application further provides a computer readable storage medium, and a computer execution instruction is stored in the computer readable storage medium. When the instruction is executed, a computer executes the defect characterization method provided by the first embodiment to the second embodiment above when the computer execution instruction is executed by the processor, and the specific implementation mode and the technical effect are similar, which will not be elaborated here.

The application further provides a computer program product, which may include a computer program, the defect characterization method provided by the first embodiment to the second embodiment above is realized when the computer program is executed by the processor, and the specific implementation mode and the technical effect are similar, which will not be elaborated here.

It is to be noted that, the computer readable storage medium may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, a compact disc, a Compact Disc Read-Only Memory (CD-ROM) and the like. The computer readable storage medium may also be various electronic devices including one or any combination of the above memories, such as mobile phones, computers, tablet devices, personal digital assistants, etc.

It is to be noted that, in this context, the terms "include", "containing" or any other variation thereof are intended to cover non exclusive inclusion, so that a process, method, article or device that includes a series of elements includes not only those elements, but also other elements not explicitly listed, or elements inherent in such process, method, article or device. Without further restrictions, the element defined by the statement "including a . . . " does not exclude the existence of another same element in the process, method, article or device including the element.

The above serial number of the embodiment of the application is only for description and does not represent the advantages and disadvantages of the embodiment.

Through the description of the above embodiments, those skilled in the art can clearly understand that the above embodiment method can be realized by means of software and necessary general hardware platforms. Of course, it can also be realized by hardware, but in many cases, the former is a better embodiment. Based on this understanding, the embodiments of this application may be embodied in the form of a software product. The computer software product is stored in a storage medium (such as a ROM/RAM, a magnetic disc and a compact disc), including several instructions to make a terminal device (which may be a mobile phone, a computer, a server, an air conditioner, Or a network device, etc.) to execute the method described in various embodiments of the application.

The application is described with reference to the flowcharts and/or block diagrams of the method, the device (system), and the computer program product according to the embodiment of the application. It should be understood that, each process and/or block in the flowchart and/or block diagram and the combination of processes and/or blocks in the flowchart and/or block diagram may be implemented by a computer program instruction. These computer program instructions may be provided for the processor of a general-purpose computer, a special-purpose computer, an embedded processor or other programmable data processing devices to generate a machine, and therefore, a device for realizing the functions specified in one or more processes of the flowchart and/or one or more blocks of the block diagram is generated through the instruction executed by a processor of a computer or other programmable data processing devices.

These computer program instructions may also be stored in a computer-readable memory capable of guiding a computer or other programmable data processing devices to work in a specific manner, so that the instructions stored in the computer readable memory generates a manufacturing product including an instruction device, The instruction device implements the functions specified in one or more processes of the flowchart and/or one or more blocks of the block diagram.

These computer program instructions may also be loaded on a computer or other programmable data processing devices, so that a series of operation steps are performed on the computer or other programmable devices to produce computer implemented processing, thus, instructions executed on a computer or other programmable devices provide steps for implementing the functions specified in one or more processes of the flowchart and/or one or more blocks of the block diagram.

What is claimed is:

1. A defect characterization method, comprising:
   obtaining a first scanning image and target defect coordinates in the first scanning image;
   obtaining a first defect image according to the target defect coordinates in the first scanning image, the first defect image containing a defect area where a target defect is located and a noise area not containing the target defect;
   marking the noise area, performing Automatic Defect Review (ADR) calculation on the defect area, and obtaining a pixel level value of a defect in the defect area;
   obtaining coordinates of the defect with a maximum pixel level value, and obtaining a second defect image according to the coordinates of the defect with the maximum pixel level value; and
   classifying the defect with the maximum pixel level value according to the second defect image.

2. The method according to claim 1, wherein the first scanning image is obtained through a check system, the check system comprises a laser scanning patterned defect check system;
   the first defect image and the second defect image are obtained through the check system, and
   the check system comprises a review Scanning Electric Microscope (SEM).

3. The method according to claim 1, wherein the step of obtaining a first defect image according to the target defect coordinates in the first scanning image comprises:
   obtaining the first defect image containing the target defect with the target defect coordinates as center point coordinates.

4. The method according to claim 3, wherein resolution of the first defect image is greater than resolution of the first scanning image.

5. The method according to claim 1, wherein the step of obtaining a second defect image according to the coordinates of the defect with the maximum pixel level value comprises:
   locally enlarging the first defect image with the coordinates of the defect with the maximum pixel level value as center point coordinates to obtain the second defect image.

6. The method according to claim 1, before the step of classifying the defect with the maximum pixel level value according to the second defect image, further comprising:
   judging whether the defect with the maximum pixel level value is the target defect in the first scanning image or not;
   in response to that the defect with the maximum pixel level value is the target defect in the first scanning image, classifying the defect with the maximum pixel level value; and
   in response to that the defect with the maximum pixel level value is not the target defect in the first scanning image, returning to mark the defect area containing the defect with the maximum pixel level value in the first defect image, performing ADR calculation on an unmarked area in the defect area, obtaining the defect with the maximum pixel level value again, judging whether the defect with the maximum pixel level value is the target defect in the first scanning image or not, and repeating the above steps till the defect with the maximum pixel level value is the target defect in the first scanning image.

7. A terminal device, comprising a memory, a processor and a transceiver, wherein the memory is configured to storage an instruction, the transceiver is configured to communicate with other devices, wherein when executing the instruction stored in the memory, the processor is configured to:
obtain a first scanning image and target defect coordinates in the first scanning image;
obtain a first defect image according to the target defect coordinates in the first scanning image, the first defect image containing a defect area where a target defect is located and a noise area not containing the target defect;
mark the noise area, performing Automatic Defect Review (ADR) calculation on the defect area, and obtain a pixel level value of a defect in the defect area;
obtain coordinates of the defect with a maximum pixel level value, and obtain a second defect image according to the coordinates of the defect with the maximum pixel level value; and
classify the defect with the maximum pixel level value according to the second defect image.

8. The terminal device according to claim 7, wherein the first scanning image is obtained through a check system, the check system comprises a laser scanning patterned defect check system;
the first defect image and the second defect image are obtained through the check system, and
the check system comprises a review Scanning Electric Microscope (SEM).

9. The terminal device according to claim 7, wherein when obtaining the first defect image according to the target defect coordinates in the first scanning image, the processor is configured to:
obtain the first defect image containing the target defect with the target defect coordinates as center point coordinates.

10. The terminal device according to claim 9, wherein resolution of the first defect image is greater than resolution of the first scanning image.

11. The terminal device according to claim 7, wherein when obtaining the second defect image according to the coordinates of the defect with the maximum pixel level value, the processor is configured to:
locally enlarge the first defect image with the coordinates of the defect with the maximum pixel level value as center point coordinates to obtain the second defect image.

12. The terminal device according to claim 7, before classifying the defect with the maximum pixel level value according to the second defect image, the processor is further configured to:
judge whether the defect with the maximum pixel level value is the target defect in the first scanning image or not;
in response to that the defect with the maximum pixel level value is the target defect in the first scanning image, classify the defect with the maximum pixel level value; and
in response to that the defect with the maximum pixel level value is not the target defect in the first scanning image, return to mark the defect area containing the defect with the maximum pixel level value in the first defect image, perform ADR calculation on an unmarked area in the defect area, obtain the defect with the maximum pixel level value again, judge whether the defect with the maximum pixel level value is the target defect in the first scanning image or not, and repeat the above steps till the defect with the maximum pixel level value is the target defect in the first scanning image.

13. A nonvolatile computer readable storage medium, wherein a computer-executable instruction is stored in the computer readable storage medium, wherein when executed by a computer, the instruction is configured to:
obtain a first scanning image and target defect coordinates in the first scanning image;
obtain a first defect image according to the target defect coordinates in the first scanning image, the first defect image containing a defect area where a target defect is located and a noise area not containing the target defect;
mark the noise area, performing Automatic Defect Review (ADR) calculation on the defect area, and obtain a pixel level value of a defect in the defect area;
obtain coordinates of the defect with a maximum pixel level value, and obtain a second defect image according to the coordinates of the defect with the maximum pixel level value; and
classify the defect with the maximum pixel level value according to the second defect image.

14. The storage medium according to claim 13, wherein the first scanning image is obtained through a check system, the check system comprises a laser scanning patterned defect check system;
the first defect image and the second defect image are obtained through the check system, and
the check system comprises a review Scanning Electric Microscope (SEM).

15. The storage medium according to claim 13, wherein when obtaining the first defect image according to the target defect coordinates in the first scanning image, the instruction is configured to:
obtain the first defect image containing the target defect with the target defect coordinates as center point coordinates.

16. The storage medium according to claim 15, wherein resolution of the first defect image is greater than resolution of the first scanning image.

17. The storage medium according to claim 13, wherein when obtaining the second defect image according to the coordinates of the defect with the maximum pixel level value, the instruction is configured to:
locally enlarge the first defect image with the coordinates of the defect with the maximum pixel level value as center point coordinates to obtain the second defect image.

18. The storage medium according to claim 13, before classifying the defect with the maximum pixel level value according to the second defect image, the instruction is further configured to:
judge whether the defect with the maximum pixel level value is the target defect in the first scanning image or not;
in response to that the defect with the maximum pixel level value is the target defect in the first scanning image, classify the defect with the maximum pixel level value; and
in response to that the defect with the maximum pixel level value is not the target defect in the first scanning image, return to mark the defect area containing the defect with the maximum pixel level value in the first defect image, perform ADR calculation on an unmarked area in the defect area, obtain the defect with the maximum pixel level value again, judge whether the defect with the maximum pixel level value is the target defect in the first scanning image or not, and repeat the above steps till the defect with the maximum pixel level value is the target defect in the first scanning image.

\* \* \* \* \*